FM STEREO MULTIPLEX RECEIVER HAVING LIMITING MEANS IN THE PILOT CHANNEL

Original Filed June 18, 1962

INVENTOR.
LOVA PLUS &
RICHARD A. SANTILLI
BY Eugene M. Whitacre
ATTORNEY

United States Patent Office 3,235,663
Patented Feb. 15, 1966

3,235,663

FM STEREO MULTIPLEX RECEIVER HAVING LIMITING MEANS IN THE PILOT CHANNEL

Lova Plus, South Bound Brook, and Richard A. Santilli, Somerville, N.J., assignors to Radio Corporation of America, a corporation of Delaware Continuation of application Ser. No. 203,153, June 18, 1962. This application Mar. 2, 1965, Ser. No. 438,464
8 Claims. (Cl. 179—15)

Figure 1:
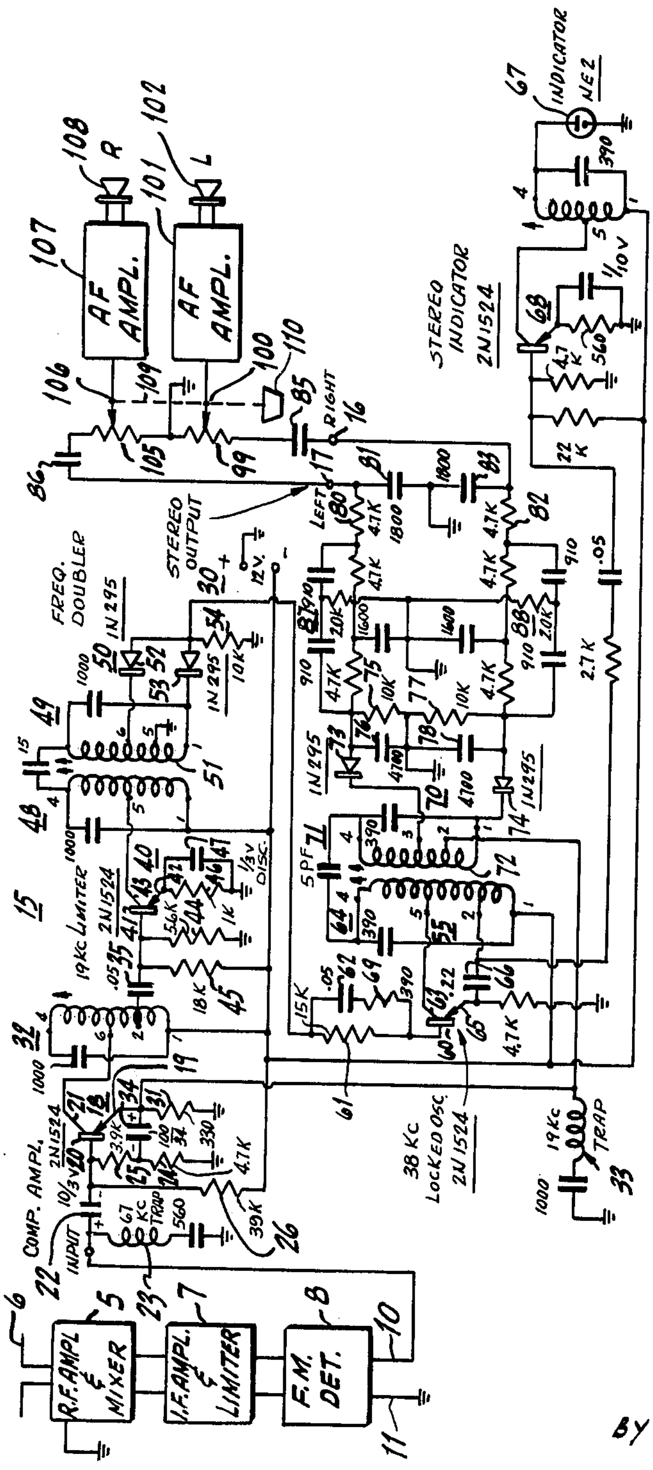

This is a continuation of our application, Serial Number 203,153, filed June 18, 1962.

The present invention relates to stereophonic multiplex radio signal receivers, and more particularly to compatible stereophonic multiplex frequency-modulation (FM) radio receivers which operate in response to both monophonic and stereophonic signal information on a single modulated carrier wave.

In such receivers, under the presently accepted method of broadcasting, the carrier wave is frequency-modulated by the sum of two modulating audio frequency signals, such as two stereophonically-related left and right or (L) and (R) signals, as a single modulating signal in the usual manner for FM broadcast and compatible reception by existing monophonic receivers. However, in the multiplex system, the carrier wave further is simultaneously provided with stereophonic information effective for signal separation, in the form of a suppressed carrier subcarrier signal which is amplitude-modulated with the difference of the two stereophonically-related signals to be transmitted, and a pilot signal for use in demodulating the suppressed carrier signal.

The compatible composite stereophonic signal at the multiplex output circuit or terminal of the frequency-modulation detector of the multiplex receiver is thus composed of the main frequency-modulation signal component, which is the compatible signal used by an unmodified or monophonic frequency-modulation receiver, 19 kc. (kilocycles per second) pilot signal, and sidebands representative the difference-frequency $(L-R)$ signal extending from 23 kc. to 53 kc. The sum and difference matrixing in conjunction with the AM suppressed-carrier subchannel permits a maximum of 90% modulation of the main carrier either by the sum $(L+R)$ modulation audio frequency signal itself, or the difference $(L-R)$ modulation-signal suppressed-carrier subchannel signal. The phase and frequency response of both the "sum" and "difference" signal channels are substantially the same over an audio-frequency range of 50–15,000 cycles (cycles per second) for example, and good channel separation can be attained.

In addition it is contemplated, in accordance with the present method of broadcasting, to provide SCA (Subsidiary Communications Authorization) background music or program material in a second subcarrier signal channel, that may be on a subcarrier frequency of 67 kc. and that can modulate the main carrier up to 10% with sidebands of approximately 8 kc. on each side, in an upper band between 59 kc. and 75 kc.

There are many existing frequency-modulation receivers in use that can be or are arranged for adaption to stereophonic signal translation and reproduction by the provision of multiplex signal output connection means at the frequency-modulation detector and preceding the de-emphasis circuit. A stereophonic multiplex unit for separating and deriving the two stereophonically-related signals from a compatible stereophonic signal is thus desirable and can be made integral with new receivers or applied as an adapttor unit to existing receivers.

In general, two major types of multiplex demodulators have been used for demodulating the subcarrier sidebands and reconstructing the original stereophonic signals. In one type of system, the subcarrier sidebands and a demodulating wave derived from the 19 kc. pilot signal are fed to a synchronous detector to demodulate the subcarrier sidebands and obtain the $(L-R)$ signal. The $(L-R)$ signal is then combined with the $(L+R)$ signal in suitable matrix circuitry to derive the original left and rght signals. The other major type of system is referred to as the time division multiplex or switching system wherein the composite stereophonic signal is fed to a detector circuit together with a switching or demodulating wave derived from the pilot signal. In this type of system the top and bottom envelopes of the composite wave are synchronously sampled to directly provide, the left and right output signals.

In either type of system it is common practice to use the received pilot signal to synchronize a locked oscillator which generates the demodulating wave. The phase of the demodulating wave must be kept fixed with respect to that of the pilot signal if adequate separation between the resultant stereophonic signals is to be achieved and maintained. However it has been noted in known types of stereophonic FM receivers that the phase of the demodulating wave from the locked oscillator changes relative to the phase of the pilot signal as the pilot signal amplitude varies due to variations in signal strength.

When a frequency modulation station to which the receiver is tuned is not transmitting a pilot signal (19 kc.) and broadcasts monaural or single channel program material, it is desirable to disable the locked oscillator and to translate the monaural transmissions without the need for switching and without appreciable distortion.

It is accordingly an object of this invention to provide an improved stereophonic multiplex unit for FM receivers.

A further object of this invention is to provide an improved stereophonic multiplex unit for FM radio receivers in which the phase of the demodulating wave remains locked to that of the pilot signal over wide input signal variations to permit good separation between the stereophonic channels.

A still further object of this invention is to provide an improved stereophonic multiplex unit for use with an FM radio which automatically permits the translation of monaural or stereophonic transmissions without the need for manual switching.

The composite stereophonic signal from the FM receiver demodulator is fed to circuitry for separating the pilot signal from the remainder of the composite signal. The pilot signal is then fed to signal limiting circuit means which is operable to produce a relatively constant signal output voltage for substantially the entire expected range of pilot signal voltages from the FM receiver demodulator. In accordance with an embodiment of the invention, the limiting circuit means comprises a sharp cut off device, such as a transistor, which operates into a very high impedance load and which is biased to have a restricted dynamic signal operating range. The high impedance load comprises a high Q circuit resonant at the pilot signal frequency to restore the 19 kc. sine wave, after the limiting process.

The limited pilot signal is then used to control the phase of a locked oscillator which operates at the subcarrier frequency to develop a demodulating wave for the subcarrier detector. By way of example, the locked oscillator may be normally biased to an inoperative condition, and the limited pilot signal may be passed through a full wave rectifier doubler circuit which provides a turn on voltage for the oscillator as well as synchronizing pulses at twice the frequency of the pilot signal. Due to the limiting process, the amplitude of the pilot signal as applied to the locked oscillator remains substantially constant for wide variations in signal level, and consequently the phase of the locked oscillator remains fixed with respect to the phase of the pilot signal. In addition, since the amplitude of the demodulating wave developed by the locked oscillator is a function of the level of the applied synchronizing pulses, the pilot signal can be adjusted to a relatively fixed level which maintains the optimum oscillator output level.

The composite stereophonic signal is fed to a suitable subcarrier detector such as a time division multiplex type detector including a pair of diodes. A demodulating wave from the locked oscillator alternately switches the diodes on and off to sample, respectively, the positive and negative envelopes of the composite wave to directly develop the original left and right stereophonic signals. Because the phase of the demodulating signal is rigidly controlled, the cross talk problem between the stereophonic channels is considerably alleviated.

In accordance with a feature of the invention the diodes of the multiplex type detector are provided with a quiescent forward bias to permit the translation therethrough of monophonic signals without appreciable distortion. If desired, the forward bias for the diodes may be derived from amplifier devices in the receiver.

The circuitry for separating the pilot signal from the remainder of the composite signal may comprise a preamplifier device which operates as an emitter or cathode follower for the composite signal and as an amplifier for the pilot signal. The preamplifier also reduces the loading on the FM demodulator circuit. In accordance with another feature of the invention a series resonant trap circuit tuned to the pilot signal frequency is connected to bypass the emitter or cathode output circuit of the preamplifier to prevent losses at the pilot signal frequency. The preamplifier thus provides a greater gain at the pilot signal frequency, so that limiting of the pilot signal in the limiting circuit means begins at a lower pilot input signal level than would otherwise occur.

Figure 2:
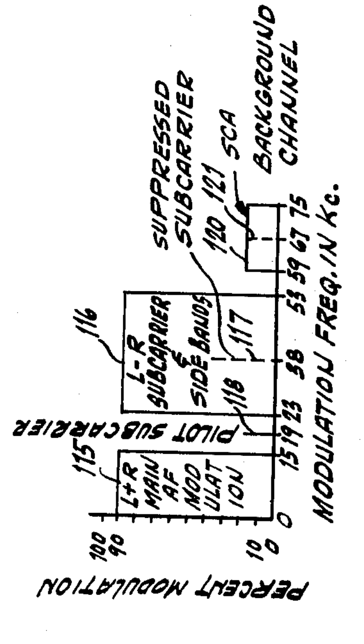

The novel features which are considered to be characteristic of this invention are set forth with particularity in the appended claims. The invention, itself, however, both as to its organization and method of operation as well as additional objects and advantages thereof will best be understood from the following description when read in connection with the accompanying drawings in which:

FIGURE 1 is a schematic circuit diagram of a stereophonic multiplex demodulator unit embodying the invention, shown in connection with an FM receiver and an audio amplifier in block form; and, FIGURE 2 is a graph indicating the range of frequency spectrum and modulation components of a composite modulation signal as applied to the stereophonic multiplex unit of FIGURE 1, with reference to certain operating features of the invention.

Referring to the drawings and more particularly to FIGURE 1, the receiver circuit shown in block form is representative of any frequency modulation receiver which may be adapted for stereophonic multiplex operation. In this respect it is provided with the useful R.-F. amplifier and mixer 5 tunable through the frequency modulation band of 88 to 108 mc., and coupled to antenna means 6 and the usual I.-F. amplifier and limiter 7 which is followed by a suitable FM detector 8. The FM detector 8 includes a pair of output terminals 10 and 11 across which are developed the main channel or $(L+R)$ signals, the subcarrier sidebands representative of the $(L-R)$ signal and the 19 kc. pilot signal.

Connected with the multiplex output circuit or terminals 10–11 of the FM detector 8 is a stereophonic multiplex unit 15 for deriving two stereophonically-related (L and R) or like modulation signals from the composite signal at the FM detector output terminals. This unit may be added to existing receivers or may be built integrally therewith during manufacture, and provides, at two stereo or channel output terminals 16 and 17, the separated modulation component signals such as the L and R stereo signals in the present example.

In the stereo multiplex unit 15, a signal amplifier stage is provided in connection with a transistor 18 having an emitter electrode 19, a base electrode 20 and a collector electrode 21. Signals from the FM detector 8 output terminals 10 and 11 are fed through a coupling network including a coupling capacitor 22 to the base electrode 20. The coupling network also includes a shunt trap circuit 23 tuned to the frequency of an SCA subcarrier which may be transmitted on the main carrier wave. The shunt trap 23 comprises an inductor and a capacitor connected in series across the output terminals 10 and 11, and tuned to resonate at 67 kc., the frequency of the SCA subcarrier wave.

A voltage divider including the resistors 24, 25 and 26 connected in series across the terminals of an operating potential supply source 30, set the bias at the base 20 of the transistor 18. The transistor 18 operates as an emitter follower for the composite signal from the FM detector 8, and thus includes a load resistor 31 connected between the emitter and ground. In addition, the transistor 18 operates as an amplifier for the pilot signal, the amplifier load comprising a parallel resonant tank circuit 32 tuned to 19 kc. which connects the collector electrode 21 to the negative terminal of the operating potential supply source 30. To prevent loss of the 19 kc. component across the load resistor 31, a trap circuit 33 tuned to the pilot signal frequency or 19 kc. is connected between the emitter 19 and ground.

A capacitor 34 is connected between the emitter electrode 18 and the junction of the resistors 24 and 25 to increase the apparent input impedance of the preamplifier stage, and thereby aid in reducing the loading of the stereo multiplex unit on the FM detector 8. If desired, the frequency response of the preamplifier stage may be designed to compensate for a possible "rolloff" at high frequencies of the stage preceding the stereo multiplex unit.

The pilot signal components developed in the tank circuit 32 are coupled through a capacitor 35 to a limiter stage 40. The limiter stage includes a transistor having a base electrode 41, an emitter electrode 42 and a collector electrode 43. The operating point of the limiter stage 40 is set by a voltage divider including the resistors 44 and 45 connected in series across the operating potential supply source, and an emitter biasing resistor 46. The emitter resistor 46 is bypassed by a capacitor 47.

The output circuit for the limiter stage 40 comprises a double tuned network including a first resonant circuit 48, which connects the collector electrode 43 to the operating potential supply source and a second resonant circuit 49.

The double tuned output circuit which is tuned to the pilot signal frequency, provides a high impedance load circuit for the limiter stage 40, thereby enabling high gain. In addition, the biasing conditions for the limiter stage are such as to provide a restricted dynamic operating range. The limiter stage of FIGURE 1, was found to limit for input signal levels from the FM detector 8 ranging from 50 millivolts (mv.) to 500 millivolts, which is the expected range of signal levels where the FM detector 8 comprises a ratio detector.

The double tuned circuits 48 and 49 operates to restore the limited 19 kc. pilot signal to a sine wave.

Frequency doubling of the 19 kc. pilot signal is effected by a full wave rectifier circuit 50. The full wave rectifier 50 includes a grounded center tapped winding portion 51 in the tuned circuit 49. In addition, the full wave rectifier frequency doubler includes a pair of diodes, which are shown as semiconductor diodes 52 and 53, the anodes of which are connected together and the cathodes of which are connected respectively to opposite ends of the winding 51. The direct current paths for the diodes 52 and 53 is completed through a resistor 54 to ground and the center tap of the winding portion 51.

A grounded base oscillator circuit 55 which is inoperative in the absence of the pilot signal includes a transistor having a base electrode 60 which is coupled through a parallel resistor 61, capacitor 62 network to the junction between the diodes 52 and 53 and the resistor 54 to receive a turn-on voltage and a phase locking signal when a 19 kc. pilot signal is received. The susceptibility of the oscillator circuit to ringing as a result of noise during monophonic reception is materially reduced by a resistor 69 in series with the capacitor 62.

The collector electrode 63 of the transistor is connected to a source of operating potential through a parallel resonant tank circuit 64 tuned to 38 kc., which is twice the frequency of the pilot signal. The parallel resonant circuit includes a tunable inductor having a tap to which the emitter electrode 65 is coupled through a capacitor 66. The feedback to the emitter 65 is such as to sustain oscillation when the transistor is properly biased. During monophonic reception the oscillator transistor is cut-off because there is no forward bias between the emitter and base electrodes. When a pilot signal is received the direct voltage appearing across the resistor 54 provides a forward bias which permits the oscillator circuit to commence oscillation locked to the 38 kc. ripple component produced by the full wave rectification of the pilot signal.

A stereophonic reception indicator circuit comprises a neon tube 67, which is driven by a transistor amplifier 68. When stereophonic signals are received, as characterized by the presence of the pilot signal, the oscillator circuit 55 is activated. The 38 kc. demodulating voltage produced in the tank circuit 64 is fed from the tap on the tank circuit 64 inductor to the transistor amplifier which in turn excites the neon tube causing it to ignite. Thus, the neon tube 37 lights only during stereophonic signal reception.

A demodulating or switching voltage at 38 kc. from the oscillator circuit 55 is coupled to a time division multiplex type detector circuit 70 which is operative to derive the left (L) and right (R) signals directly from the composite signal. The detector circuit 57 includes a resonant circuit 71 including and inductor coupled to the oscillator tank circuit 64. The resonant circuit 71 inductor includes a center tapped winding portion 72 coupled to a pair of diodes 73 and 74. The cathode of the diode 73 is connected to one end of the winding portion 72, and the anode thereof is coupled through a parallel resistor 75, capacitor 76 network to ground. The cathode of the diode 74 is connected to the opposite end of the winding portion 72, and the anode thereof is coupled through a parallel resistor 77, capacitor 78 network to ground.

The composite signal information appearing at the emitter 19 of the preamplifier transistor is inserted into the detector circuit 70 at the center tap of the winding portion 72. As is known, the positive envelope of the composite signal corresponds to one of the stereophonic signals, and the negative envelope of the composite signal corresponds to the other of the stereophonic signals. The 38 kc. switching voltage from the oscillator 55 synchronously switches the diodes 73 and 74 on and off to sequentially sample the positive and negative envelope of the composite waves. In the present example, the envelope sampled by the diode 73 corresponds to the R signal and the envelope sampled by the diode 74 corresponds to the L signal.

The right and left output signals from the diodes 73 and 74 are fed respectively through twin T filters 87 and 88 to eliminate higher order frequency components such as the 38 kc. switching signal. The R signal is fed through a de-emphasis circuit including a series resistor 80 and a shunt capacitor 81, and in like manner the L signal is fed through a deemphasis circuit including a series resistor 82 and shunt capacitor 83. The L and R signals are attenuated at approximately a rate of 75 microseconds to provide high frequency de-emphasis. Such de-emphasis compensates for the high frequency pre-emphasis added at the transmitter to improve the overall signal to roise ratio of the FM transmission and receiving system.

In order to prevent distortion during monaural operation, the diodes 73 and 74 in the subcarrier detector circuit 70 are slightly forward biased. In the present circuit, the forward biase for the diodes 73 and 74 is provided by directly coupling the emitter 19 of the preamplifier to the center tap of the winding portion 71 so that the negative voltage appearing at the emitter 19 is applied to the cathodes of the diodes. In practice it was found that with germanium diodes about 130 millivolts provided acceptable translation of the monophonic signals through the subcarrier detector without distortion. This forward bias does not interfere with stereophonic operation because of the much larger magnitude of the switching voltage from the locked oscillator 55. If desired, the forward bias on the diodes 73 and 74 could be provided in other ways, as by a voltage divider connected with the center tap of the winding portion 72, with A.-C. coupling from the center tap to the emitter 19.

The radio receiver signal translating system includes suitable means connected with the terminals 16 and 17 of the stereo multiplex unit to amplify and reproduce the two channel signals which are here assumed to be the left and right, or L and R, audio-frequency signals which are stereophonically-related. To this end, the terminal 16 is coupled through a capacitor 85 to an output volume-control potentiometer resistor 99 having an output volume control contact 100 connected with a suitable audio frequency channel amplifier 101, as indicated, which has a common ground return connection and is connected to drive a left-channel output loudspeaker 102.

Likewise the output terminal 17 is coupled through a capacitor 86 to a second channel volume-control potentiometer resistor 105 having an output volume control contact 106 connected to the second channel amplifier means 107, having a common ground return connection and a right channel output loudspeaker 108 connected therewith as shown. As is customary, the volume-control means are gang-connected for joint operation as indicated by the dotted line connection 109 and the common volume control knob represented at 110 in connection therewith. This dual-channel signal translating circuit and sound-reproducing output means therefor is representative of any suitable means of this type normally provided in a stereophonic sound reproducing system.

Referring now to FIGURE 2 along with FIGURE 1, the operation of the multiplex unit in the receiver may now be considered. The composite signal at the multiplex output terminals 10–11 of the FM detector 8 when the receiver is responding to compatible stereophonic signals, may be represented by the graph of FIGURE 2 drawn with reference to the FM carrier modulation frequency in kilocycles along the X axis and percentage modulation along the Y axis which also indicates relative amplitudes of subcarrier signals. It will be seen that the total signal is composed of an $(L+R)$ component 115 which may provide as much as 90% modulation and an $(L-R)$ double-sideband suppressed-carrier AM signal component 116 which may also modulate the carrier up to 90% as indicated. In other words when the component 115 is maximum the component 116 is minimum.

In the graph of FIGURE 2 it is assumed that the audio-frequency modulation will extend from zero to 15 kc. As a practical matter it is known that the modulation frequency actually may extend between 50 cycles and slightly less than 15 kc., depending upon the fidelity of the studio equipment used for modulating the system. The restored suppressed-carrier signal indicated by the dotted line 117 is at 38 kc. and is the second harmonic of the pilot carrier represented at 118 with a frequency of 19 kc. The sidebands of the suppressed subcarrier extend substantially from 23 kc. to 53 kc.

as indicated, thereby to provide for substantially the full 15 kc. modulation referred to.

The possible SCA background music channel is indicated by the block 120 and extends 8 kc. on either side of a 67 kc. subcarrier signal indicated by the dotted line 121.

When a stereophonic FM signal is being received by the FM receiver, a composite signal as represented in FIGURE 2 is developed across the output terminals of the FM detector 8.

The resultant signal is amplified in the stage 18, with the 19 kc. pilot signal being developed in the tuned collector 21 circuit, and the composite signal in the emitter 19 circuit. The presence of the trap circuit 33 in parallel with the emitter resistor 31 prevents a loss of the 19 kc. pilot signal, across the resistor 31. This permits a larger amplitude pilot signal to be applied to the limiter stage 40 for a given signal level from the FM detector 8. With the trap circuit 33, it was found that the stage 40 begins to limit when the signal level at the terminals 10 and 11 is about 50 mv. Without the trap circuit 33 the limiter stage 40 begins limiting when the signal input level is about 100 mv.

The limiter stage 40 operates between saturation and cutoff and provides a substantially constant pilot signal output over substantially the entire expected range of input signal amplitudes from the FM detector 8. With the pilot signal amplitude held at a constant amplitude, the phase of the oscillator output wave can be maintained in predetermined phase relation with respect to the transmitted pilot signal to insure good separation between the stereophonic channels. The same principle is also applicable to synchronous subcarrier detectors using a locked oscillator to generate a demodulating signal for use in a subcarrier detector to derive the $(L-R)$ components.

The 19 kc. pilot signal is applied to the full wave rectifier circuit 50 which operates in a known manner to produce pulses at a 38 kc. rate across the resistor 54. The 38 kc. pulses are applied to the oscillator circuit 55 to lock the oscillator 38 kc. output wave in predetermined phase relation with the received pilot signal. Since the amplitude of the pulses applied to the oscillator 55 are substantially immune to changes in applied signal level, the relative amplitude of the pulses as applied to the oscillator is selected to maintain the amplitude of the oscillator output voltage at the desired optimum level for demodulation. It will be understood that the amplitude of the oscillator output voltage is a function of the amplitude of the applied synchronizing pulses.

In the circuit described, the synchronizing pulses applied to the oscillator 55 are effective to lock the oscillator over $\pm 2$ kc. deviation from 38 kc. with composite signal inputs from the FM detector 8 of greater than 50 mv. This is important because it insures that oscillator activity and phase lock of the oscillator output with the pilot signal are maintained over a wide range of signal input voltages from the FM detector 8.

During monophonic reception no voltage is developed across the resistor 54 so that no forward bias is available to turn on the transistor of the oscillator 55. Hence the oscillator is inactive. Spurious noise signals at 19 kc. do not turn the oscillator on because of the characteristics of the resistor-capacitor base 60 network 61, 62 and 69.

What is claimed is:

1. A circuit for frequency modulation stereophonic receivers comprising:

an input circuit for coupling to a source of composite stereophonic signals including a pilot signal, means coupled to said input circuit for selecting said pilot signal, limiting amplifier circuit means coupled to said means for selecting said pilot signal, said limiting circuit means including fixed biasing means for setting the operating point of said limiting circuit so as to restrict the dynamic operating range thereof to limit the amplitude of said pilot signal to a substantially constant level over substantially the entire range of usable input signal levels developed in said input circuit, means providing an oscillator circuit for developing a voltage at a frequency related to the frequency of said pilot signal, means coupling said limiting circuit means to said oscillator circuit to synchronize said oscillator at a frequency related to that of said pilot signal, and a detector coupled to receive said oscillator voltage and signals from said input circuit.

2. A signal translating circuit for frequency modulation stereophonic receivers comprising:

an input circuit for coupling to a source of composite stereophonic signals including audio frequency signals, subcarrier sideband signals, and a pilot signal, said input circuit including a preamplifier device for providing substantially constant gain throughout the frequency range including said audio and subcarrier sideband signals and reactive circuit means coupled to said preamplifier device for altering the gain-frequency characteristic thereof to produce increased gain at the frequency of said pilot signal;

means coupled to said input circuit for selecting said pilot signal, limiting amplifier circuit means coupled to said means for selecting said pilot signal, said limiting amplifier circuit means including fixed biasing means for setting the operating point of said limiting circuit so as to restrict the dynamic operating range thereof to limit the amplitude of said pilot signal to a substantially constant level over substantialy the entire range of usable input signal levels applied to said input circuit, means providing an oscillator circuit for developing a voltage at a frequency related to the frequency of said pilot signal, and at an amplitude determined by the amplitude of a synchronizing signal applied thereto, a detector coupled to receive signals from said input circuit and a predetermined amplitude of said oscillator voltage, and means coupling said limiting circuit means to said oscillator circuit to synchronize said oscillator at a frequency related to that of said pilot signal, the amplitude of the synchronizing signal applied to said oscillator being such that said voltage developed by said oscillator corresponds to said predetermined amplitude.

3. A signal translating circuit for frequency modulation stereophonic receivers comprising:

an input circuit for coupling to a source of composite stereophonic signals including a pilot signal, said input circuit including a preamplifier device having an input electrode, an output electrode and a common electrode, an impedance element coupled between said common electrode and a point of fixed reference potential, a tuned circuit tuned to the frequency of said pilot signal coupled between said output electrode and said point of fixed reference potential, a trap circuit tuned to the frequency of said pilot signal connected in parallel with said impedance element, limiter circuit means coupled to said tuned circuit for limiting the amplitude of said pilot signal to a substantially constant level over substantially the entire range of usable input signal levels applied to said input circuit, means providing an oscillator circuit for developing a voltage at a frequency related to the frequency of said pilot signal, means coupling said limiter circuit means to said oscillator circuit to synchronize said oscillator at a frequency related to that of said pilot signal, a detector coupled to receive said oscillator voltage and signals from said input circuit.

4. A subcarrier detector for frequency modulation stereophonic receivers comprising:

an input circuit for coupling to a source of composite stereophonic signals including a pilot signal, said input circuit including a preamplifier device having an input electrode, an output electrode and a common electrode, an impedance element coupled between said common electrode and a point of fixed reference potential, a tuned circuit tuned to the frequency of said pilot signal coupled between said output electrode and said point of fixed reference potential, a trap circuit tuned to the frequency of said pilot signal connected in parallel with said impedance element, means for limiting the amplitude of the separated pilot signal to a substantially constant level over substantially the entire range of usable input signal levels applied to said input circuit, means providing a normally inoperative oscillator circuit for developing a voltage at a frequency related to the frequency of said pilot signal, means coupling said limiting means to said oscillator circuit to activate and synchronize said oscillator at a frequency related to that of said pilot signal when stereophonic signals including said pilot signal are received, a time division multiplex detector including a centertapped input winding portion coupled to said oscillator circuit and a pair of diodes having like electrodes coupled to opposite ends of said winding portion, and means connecting said centertap to said common electrode to receive said composite signal and a direct biasing voltage to forward bias said diodes so that said diodes translate received monophonic signals substantially without distortion.

5. A stereophonic multiplex unit for stereophonic frequency modulation receivers comprising:

a preamplifier circuit including a first transistor with base, emitter and collector electrodes, an input circuit for coupling to a source of composite stereophonic signals including a pilot signal connected between said base and emitter electrodes, a resistor connected between said emitter electrode and a point of fixed reference potential, a first tuned circuit tuned to the frequency of said pilot signal coupled between said collector electrode and said point of fixed reference potential, a limiter circuit including a second transistor having base, emitter and collector electrodes, means coupling said emitter and base electrodes of said second transistor to said first tuned circuit, a second tuned circuit tuned to the frequency of said pilot signal coupled between the collector and emitter electrodes of said second transistor to provide a high impedance load therefor, fixed biasing means coupled to said second transistor for setting the operating point of said second transistor so as to restrict the dynamic operating range thereof such that said limiter circuit maintains the amplitude of said pilot signal in said second tuned circuit substantially constant, a full-wave rectifier frequency doubler circuit including an output resistor coupled to said second tuned circuit, an oscillator circuit including a third transistor including base, emitter and collector electrodes, means coupling the base and emitter electrodes of said third transistor directly to said output resistor, an oscillator tank circuit tuned to twice the pilot signal frequency coupled between the emitter and collector electrodes of said third transistor, said third transistor normally biased to an inoperative condition, but responsive to synchronizing pulses developed across said output resistor to turn on said transistor and synchronize said oscillator at twice the frequency of said pilot signal, a time division multiplex detector including a centertapped input winding portion coupled to said oscillator tank circuit, a pair of diodes having like electrodes coupled to opposite ends of said winding portion, resistance-capacitance means separately connecting the remaining electrodes of said diodes to a point of reference potential, means connecting said centertap to the emitter electrode of said first transistor to receive said composite signal and a first biasing voltage to forward bias said diodes so that said diodes translate received monophonic signals substantially without distortion.

6. A stereophonic multiplex unit for stereophonic frequency modulation receivers comprising:

a preamplifier circuit including a first transistor with base, emitter and collector electrodes, an input circuit for coupling to a source of composite stereophonic signals including a pilot signal connected between said base and emitter electrodes, a resistor connected between said emitter electrode and a point of fixed reference potential, a series resonant trap circuit tuned to the frequency of said pilot signal connected in parallel with said resistor connected between the emitter of said first transistor and said point of reference potential, a first tuned circuit tuned to said pilot signal frequency coupled between said collector electrode and said point of fixed reference potential, a limiter circuit including a second transistor having base, emitter and collector electrodes, means coupling said emitter and base electrodes of said second transistor to said first tuned circuit, a second tuned circuit tuned to the frequency of said pilot signal coupled between the collector and emitter electrodes of said second transistor to provide a high impedance load therefor, said second transistor being biased so that said limiter circuit maintains said pilot signal amplitude in said second tuned circuit substantially constant, a full-wave rectifier frequency coupler circuit including an output resistor coupled to said second tuned circuit, an oscillator circuit including a third transistor including base, emitter and collector electrodes, means coupling the base and emitter electrodes of said third transistor directly to said output resistor, an oscillator tank circuit tuned to twice the frequency of said pilot signal coupled between the emitter and collector electrodes of said third transistor, said third transistor normally biased to an inoperative condition, but responsive to synchronizing pulses developed across said output resistor to turn on said transistor and synchronize said oscillator at twice the frequency of said pilot signal, a time division multiplex detector including a centertapped input winding portion coupled to said oscillator tank circuit, a pair of diodes having like electrodes coupled to opposite ends of said winding portion, resistance-capacitance means separately connecting the remaining electrodes of said diodes to a point of reference potential, means connecting said centertap to the emitter electrode of said first transistor to receive said composite signal and a first biasing voltage to forward bias said diodes so that said diodes translate received monophonic signals substantially without distortion.

7. A signal translating circuit for frequency modulation stereophonic receivers comprising:

an input circuit for coupling to a source of composite stereophonic signals including a pilot signal, means coupled to said input circuit for selecting said pilot signal, limiting amplifier circuit means coupled to said means for selecting said pilot signal, said limiting circuit means including biasing means for fixedly setting the operating point of said limiting circuit so as to restrict the dynamic operating range thereof to limit the amplitude of said pilot signal to a substantially constant level over substantially the entire range of useful input signal levels developed in said input circuit, means for developing a sub-carrier wave at a frequency related to the frequency of said pilot signal, means coupling said limiting circuit means to said sub-carrier wave developing means to produce said sub-carrier at said frequency related to the frequency of said pilot signal and at a substantially constant amplitude determined by the limited amplitude of said pilot signal, and a detector coupled to receive said sub-carrier wave from said sub-carrier wave-developing means and to receive said signals from said input circuit.

8. A stereophonic multiplex unit for stereophonic frequency modulation receivers comprising:

a preamplifier circuit including a first transistor having base, emitter and collector electrodes, an input circuit coupled between said base and emitter electrodes for coupling said first transistor to a source of composite stereophonic signals including a pilot signal, a resistor connected between said emitter electrode and a point of fixed reference potential, a first tuned circuit tuned to the frequency of said pilot signal coupled between said collector electrode and said point of fixed reference potential, a limiter circuit including a second transistor having base, emitter and collector electrodes, means coupling said emitter and base electrodes of said second transistor to said first tuned circuit, a second tuned circuit tuned to the frequency of said pilot signal coupled between the collector and emitter electrodes of said second transistor to provide a high impedance load therefor, biasing means coupled to said second transistor for fixedly setting the operating point of said second transistor to restrict the dynamic operating range thereof such that said limiter circuit maintains the amplitude of said pilot signal in said second tuned circuit at a substantially constant level, a full wave rectifier frequency doubler circuit including an output resistor coupled to said second tuned circuit, a third transistor having base, emitter and collector electrodes, means coupling the base and emitter electrodes of said third transistor directly to said output resistor, a third tuned circuit tuned to twice the frequency of said pilot signal coupled between the emitter and collector electrodes of said third transistor, said third transistor being normally biased to an inoperative condition but responsive to signals developed across said output resistor to produce a subcarrier signal at twice the frequency of said pilot signal, a time division multiplex detector including a center-tapped winding coupled to said third tuned circuit, a pair of diodes having like electrodes coupled to opposite ends of said winding, resistance-capacitance means separately connecting the remaining electrodes of said diodes to a point of reference potential, and means connecting said center tap to the emitter electrode of said first transistor to receive said composite signal.

References Cited by the Examiner

UNITED STATES PATENTS

| | | | |
|---|---|---|---|
| 3,070,662 | 12/1962 | Eilers | 179—15 |
| 3,095,479 | 6/1963 | LeBlan | 179—15 |
| 3,133,993 | 5/1964 | DeVries | 179—15 |

FOREIGN PATENTS

| | | |
|---|---|---|
| 205,255 | 11/1956 | Australia. |

OTHER REFERENCES

IRE Transactions on Broadcast and Television Receivers, Nov. 1961, pages 40–43. (Copies available in the Scientific Library, call No. TK6563.I2.)

DAVID G. REDINBAUGH, *Primary Examiner.*